United States Patent [19]

Blanchette et al.

[11] Patent Number: 5,208,851
[45] Date of Patent: May 4, 1993

[54] METHOD FOR CONTROLLING ALLOCATION OF A COMMUNICATION LINK

[75] Inventors: Jeffrey J. Blanchette, Hoffman Estates; James C. Tykal, Streamwood; David A. Sticha, Marengo, all of Ill.

[73] Assignee: Motorola, Inc., Schaumburg, Ill.

[21] Appl. No.: 684,412

[22] Filed: Apr. 12, 1991

Related U.S. Application Data

[63] Continuation-in-part of Ser. No. 509,915, Apr. 16, 1990.

[51] Int. Cl.⁵ .............................................. H04N 13/00
[52] U.S. Cl. .................................... 379/177; 379/350; 379/377; 178/2 C; 370/58.1
[58] Field of Search .............. 379/182, 177, 350, 377; 178/2 R, 2 C; 340/825.38; 370/58.1, 110.1; 455/54

[56] References Cited

U.S. PATENT DOCUMENTS 4,368,358 1/1983 Herschtol ........................... 379/177
4,711,976 12/1987 Narjes .................................. 178/2 C
5,086,424 2/1992 Motohashi et al. ................ 370/58.1

Primary Examiner—Stafford D. Schreyer
Attorney, Agent, or Firm—Steven G. Parmelee

[57] ABSTRACT

A plurality of consoles (111-113) share use of a single landline (101) with minimal requirements for internal maintenance data signalling. As two or more consoles both share use of the link, a telephone interface (103) assigns one of the consoles to be responsible for maintenance signalling. If and when the assigned console concludes its communication needs or otherwise becomes unable to continue the maintenance signalling, the telephone interface will assign a new interested console to provide the maintenance signalling. This continues until no consoles remain having an interest in maintaining the communication link. In one embodiment, when the link is used by only a single console, a hold function can be accommodated. When two or more consoles are serviced, however, the hold function is not applied. Also, when the link has been placed on hold, any console can remove the hold condition.

14 Claims, 2 Drawing Sheets

METHOD FOR CONTROLLING ALLOCATION OF A COMMUNICATION LINK

This application is a continuation-in-part of copending U.S. Ser. No. 07/509,915, entitled "A Communication System Network" and filed on Apr. 16, 1990.

FIELD OF THE INVENTION

This invention relates generally to communication systems, including but not limited to communication systems having multiple consoles with telephone interconnect capability.

BACKGROUND OF THE INVENTION

Communication systems are growing larger and more complicated to suit ever increasing needs and requirements. As a result, a larger number of audio signal sources and destinations, such as dispatcher consoles, must now be accommodated.

In such systems, internal data signalling is used to establish and maintain certain activities. Using a telephone landline connection as an example, internal data signalling establishes the telephone landline connection, other internal data signalling maintains the connection, and yet other internal data signalling allows the telephone landline connection to be broken. When a significant number of consoles are configured to be part of a common landline communication, either as source, destination, or both, various problems arise.

For example, the signalling ordinarily required from each console to maintain the telephone landline connection becomes great in accumulation, and this can greatly burden the internal data pathway. Such signalling could be avoided if maintenance signalling were not required; in general, however, such signalling significantly facilitates efficient and economic functioning of such a system. Therefore, such an alternative raises more concerns than it resolves.

Another related problem involves how one can support certain desired functions, such as the hold function, in such an environment without giving rise to conflicts between different consoles.

Accordingly, a need exists for a method for controlling allocation of a communication link that provides the reliability of current data signalling techniques while minimizing the amount of data signalling that is required, and that further supports desired functions without encouraging conflict between different consoles.

SUMMARY OF THE INVENTION

These needs and others are substantially met through provision of the method for controlling allocation of a communication link amongst a plurality of consoles as disclosed herein. Pursuant to this method, a communication link is established upon determining a need for the link by a first console. Then, if and when additional consoles also indicate a need to use the communication link, one of the active consoles is assigned to thereafter indicate, from time to time, a continued need to retain the communication link. When the assigned console no longer needs the link, the system then assigns a different console to indicate, in a similar manner, a continued need to retain the link. Eventually, when no consoles indicate a need to use the link, the communication link is broken.

In one embodiment, the above described configuration assures that appropriate maintenance signalling will be provided so long as any consoles continue to wish to maintain the link, while avoiding the need for each and every interested console to be required to independently continuously source such maintenance signalling.

In one embodiment, the system will allow a console to place the communication link on hold when and only when a single console currently indicates a need for the link. Should more than one console need the link, the hold function will not be allowed.

In yet another embodiment, once the communication link has been placed on hold, the hold function can be released by any console, and not merely the one console that initiated the hold function.

DESCRIPTION OF A PREFERRED EMBODIMENT

Figure 1:
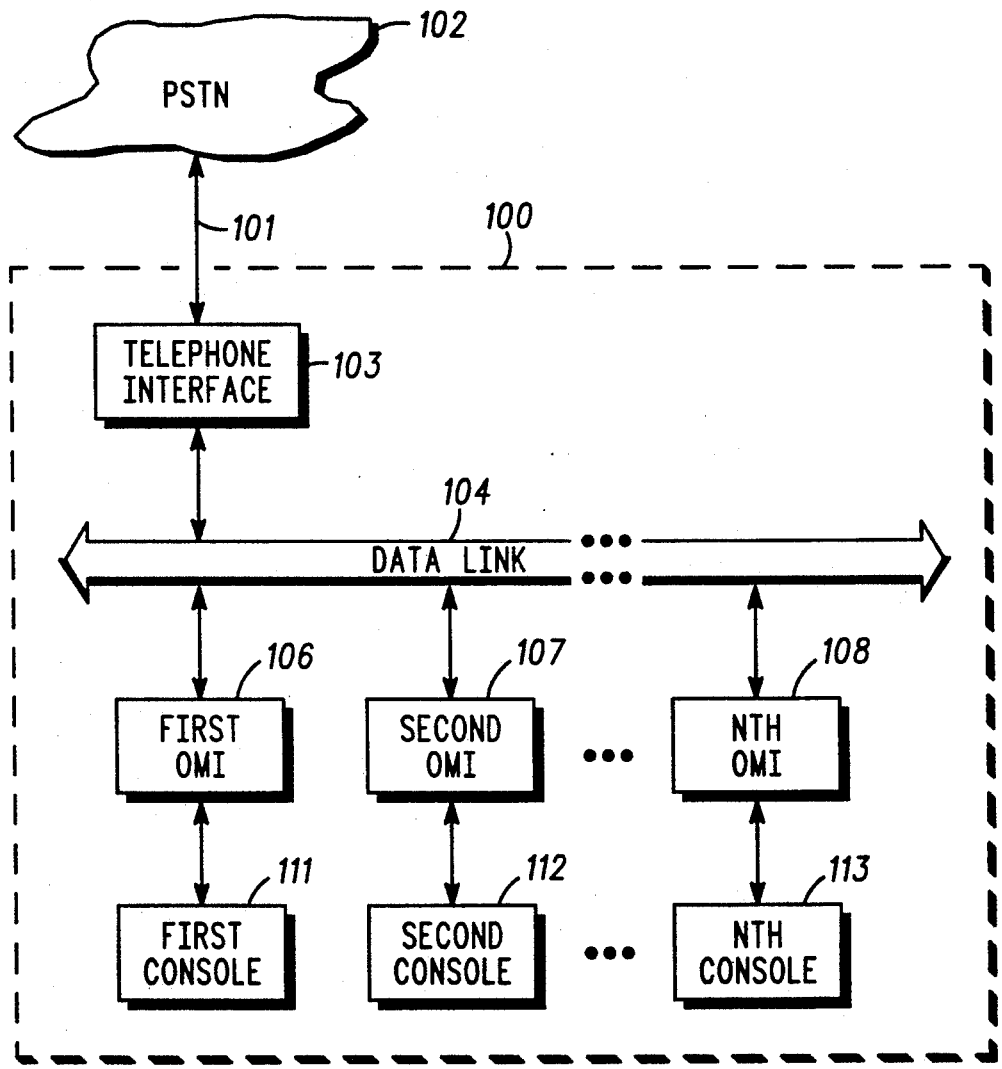
FIG. 1 comprises a block diagram depiction of a system configured in accordance with the invention.

A communication system (100) can be seen as generally depicted in FIG. 1. Various elements of such a system, which elements are not relevant to the discussion at hand, have not been depicted for the sake of clarity. The reader is referred to the aforementioned patent application entitled "A Communication System Network" for a general description of many of these elements (the contents of the aforementioned patent application are incorporated herein by this reference).

In this embodiment, the communication system (100) has an ability to establish a public switched telephone network landline link (101) to a public switched telephone network (102). Such a link (101) is established and maintained by a telephone interface (103), which telephone interface includes, in this embodiment, sufficient processing ability to allow programming to support the methodology set forth below.

The telephone interface (103) couples to a data link (104), the latter link (104) serving to disperse internal data signalling throughout the system (100). A number of operator MUX interfaces (OMI) (106, 107, and 108) each couple to the data link (104). (Such OMIs are well known in the art, and may be purchased from Motorola, Inc.) Each OMI in turn couples to an associated console (111, 112, and 113), such as a centracom series II console as manufactured and sold by Motorola, Inc.

The problem at hand arises in part when one of the consoles, such as the first console (111), initiates a communication that requires establishment of the landline link (101). Data signalling sourced by the first OMI (106) travels through the data link (104) to the telephone interface (103) to establish the landline link (101). Thereafter, the first OMI (106) must occasionally transmit an appropriate off hook signal through the data link (104) to assure the telephone interface (103) that maintenance of the landline link (101) should continue. As other consoles, for example the second console (112), join the communication in process, either as a source, destination, or both, pursuant to the prior art the second OMI (107) would also begin transmitting maintenance signalling from time to time. As more and more consoles join in the communication, the data link (104)

becomes more and more dedicated to supporting transmission of the maintenance data signals.

Figure 2:
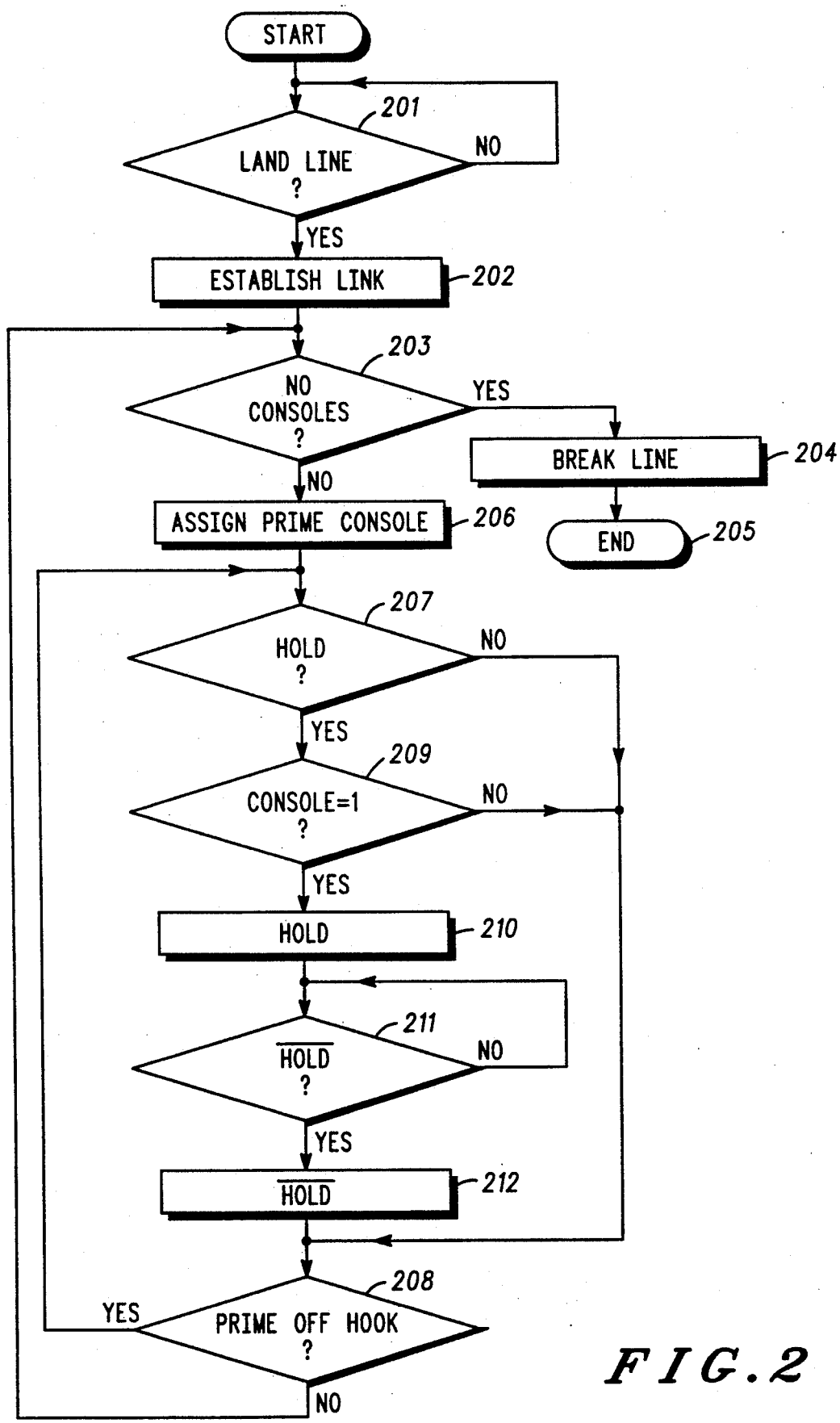
FIG. 2 comprises a flow diagram depicting operation of the system in accordance with the invention.

Referring now to FIG. 2, these problems are avoided through application of the following procedure.

At such time as a console requests a landline (201), the telephone interface (103) establishes a landline link (202) as described above. The telephone interface (103) then determines whether any consoles currently still require maintenance of the link (203). If not, the link is broken (204) and the process is concluded (205). When at least one console yet requires the link, the telephone interface (103) assigns one of the consoles to be the prime console (206). Only the prime console is thereafter responsible for transmitting, from time to time, an off hook signal intended to maintain the communication link.

The telephone interface (103) then determines whether any consoles have requested a hold condition for the link (207). If not, the interface determines whether the prime console remains off hook (208), and if not, returns to determine whether any consoles remain that still require maintenance of the link. Otherwise, when the prime console remains off hook, the telephone interface (103) continues to monitor for either a hold assertion or an on hook condition for the prime console.

When a hold assertion occurs, the telephone interface (103) determines whether more than one console has current use of the link (209). If not, thereby indicating that a plurality of consoles are using the link, the request is not implemented. When, however, only one console is active, the hold function will be asserted (210). Thereafter, the telephone interface (103) will monitor for removal of the hold condition (211) by any console, including but not limited to the console that initiated the hold condition. When a request to remove the hold occurs, the hold is removed (212) and the process continues as described above.

Pursuant to the above described configuration, a landline link (101) can be maintained with minimal maintenance signalling required, yet with a relatively high degree of confidence in the integrity of the maintenance process. Furthermore, a hold function can be accommodated when appropriate, yet avoided when assertion of the instruction may conflict with the needs of other consoles.

What is claimed is:

1. A method for controlling allocation of a communication link amongst a plurality of consoles, comprising the steps of:
    A) establishing a communication link upon determining a need for the communication link by a first console;
    B) when additional consoles indicate a need to also use the communication link, assigning one of the first and additional consoles to indicate, from time to time, a continued need to retain the communication link;
    C) when the assigned console no longer needs the communication link, assigning a different console to indicate, from time to time, a continued need to retain the communication link;
    D) when no consoles indicate a need to use the communication link, breaking the communication link.

2. The method of claim 1, wherein the step of establishing a communication link includes the step of establishing a landline link.

3. The method of claim 2, wherein the landline link comprises a public switched telephone network link.

4. The method of claim 3, wherein the step of breaking the communication link includes the step of breaking the public switched telephone network link.

5. The method of claim 1, wherein the step of assigning one of the first and additional consoles to indicate, from time to time, a continued need to retain the communication link includes the step of causing the assigned console to transmit, from time to time, a signal indicating an off-hook status.

6. The method of claim 1, wherein step C includes the step of:
    C1) determining that the assigned console no longer needs the communication link upon receiving a signal indicating an on-hook status for the assigned console.

7. The method of claim 1, wherein step B includes the step of:
    B1) allowing the additional consoles to use the communication link in accordance with a predetermined allocation method.

8. The method of claim 7, and further including the steps of:
    E) allowing a console to place the communication link on hold when one and only one console is currently indicating a need for the communication link;
    F) not allowing a console to place the communication link on hold when more than one console is currently indicating a need for the communication link.

9. A method for controlling allocation of a communication link amongst a plurality of consoles, comprising the steps of:
    A) establishing a communication link upon determining a need for the communication link by at least a first console;
    B) allowing use of the established communication link by other consoles pursuant to a predetermined allocation method;
    C) allowing a console to place the communication link on hold when one and only one console is currently indicating a need for the communication link;
    D) not allowing a console to place the communication link on hold when more than one console is currently indicating a need for the communication link.

10. The method of claim 9, wherein the step of establishing a communication link includes the step of establishing a landline link.

11. The method of claim 10, wherein the landline link comprises a public switched telephone network link.

12. The method of claim 9, and further including the step of:
    E) when the communication link is on hold, taking the communication link off hold when any console indicates a need for the communication link.

13. The method of claim 9, wherein step B includes the step of:
    B1) when additional consoles indicate a need to also use the communication link, assigning one of the first and additional consoles to indicate, from time to time, a continued need to retain the communication link;
    B2) when the assigned console no longer needs the communication link, assigning a different console to indicate, from time to time, a continued need to retain the communication link;

B3) when no consoles indicate a need to use the communication link, breaking the communication link.

14. A method for controlling allocation of a communication link amongst a plurality of consoles, comprising the steps of:
- A) establishing a communication link, which communication link includes a public switched telephone network landline link, upon determining a need for the communication link by a first console;
- B) when additional consoles indicate a need to also use the communication link, assigning one of the first and additional consoles to indicate, from time to time, a continued need to retain the communication link;
- C) when the assigned console no longer needs the communication link, assigning a different console to indicate, from time to time, a continued need to retain the communication link;
- D) allowing a console to place the communication link on hold when one and only one console is currently indicating a need for the communication link;
- E) not allowing a console to place the communication link on hold when more than one console is currently indicating a need for the communication link;
- F) when no consoles indicate a need to use the communication link, breaking the communication link.

* * * * *